Patented June 27, 1933

1,915,428

UNITED STATES PATENT OFFICE

ARTHUR LAMBERT, OF NEW YORK, N. Y., ASSIGNOR TO COSMIC ARTS, INC., OF NEW YORK, N. Y., A CORPORATION OF DELAWARE

PROCESS FOR THE MANUFACTURE OF POTASSIUM NITRATE, ETC.

No Drawing.    Application filed September 24, 1925. Serial No. 58,298.

My present invention relates to the manufacture of salts of the alkali or alkaline earth metals from complex materials containing salt or salts by the double decomposition of which the desired salt can be produced.

Thus, from complex materials containing KCl, I may produce various potassium salts, such as nitrate of potassium or carbonate of potassium. The materials employed by me are in a raw, complex condition, and the main object and advantage of my invention consists in avoiding the expensive preliminary treatments with ammonia, carbonic acid gas, or electricity which have been employed heretofore to purify the raw material before subjecting it to the main chemical process. As examples of complex mineral bodies occurring in nature and suitable for treatment acording to my invention, I will mention sylvite or sylvinite, kainite and carnallite, salar and all or any combined salt, all of which contains KCl caliche or any other combined salt which contains $NaNO_3$ and NaCl, is also adapted for such treatment, as are also ammonium carbonate and various other salts occurring in nature. Complex salts or solutions produced in the course of certain industrial processes, as well as certain complex solutions found in nature, may likewise serve as the raw material in the practical application of my process.

The subject matter of my present invention is disclosed in part in my pending application for Letters Patent filed in the United States Patent Office on November 28th, 1924, Serial No. 752,804, now Patent No. 1,797,002, and my present application is a continuation of such earlier case, as to matter common to both.

When applied to the production of potassium nitrate from sylvite or sylvinite, which are minerals containing potassium chloride and sodium chloride, and caliche, which is a mineral containing sodium nitrate and sodium chloride, my process is carried out by producing separately liquors or solutions from each of said minerals, mixing the solutions, and concentrating the mixture, removing the salt, and obtaining potassium nitrate crystals from the remaining liquid, the operations of concentration, separation of salt, and crystallization being then repeated to obtain another crop of potassium nitrate crystals.

Several examples of this treatment will now be given:

First example

By digesting and slightly heating 3.7 kilograms of sylvite or sylvinite with 8.5 liters of water, I prepared a solution of sylvite which after being separated from the residue by filtration had a strength of 25° Bé. I will call this clear solution, solution A.

I prepared separately another solution by stirring 20.5 kilograms of caliche into 61.3 liters of water; after settling the clear liquid, which I will call solution B, was drawn off, thus separating it from the dry residue. By evaporation solution B was then concentrated to 25° Bé.

Each of solutions A and B was then purified separately by adding 12.5 grams of soda ash and 2.5 grams of ammonia. After thorough stirring, the purified solution was separated by filtration from the precipitates.

Thereupon I mixed the purified solutions A and B, in about the proportion of 4 to 3 (by weight) and concentrated the mixture, by evaporation, to about one third of its original volume. The salt (NaCl) obtained as a precipitate was filtered off and washed with cold water, the amount of the latter (by weight) being slightly greater than that of the precipitate.

The filtrate was left to cool overnight, and the next day the potassium nitrate crystals deposited were separated by filtration or decanting, and washed with water. The resulting product was a first crop of potassium nitrate, about 1.35 in weight of the mixture of purified solutions A and B.

The remaining filtrate was then cooled (with ice) to 32° F. thus causing a further amount of potassium nitrate to crystallize out. The crystals were separated by filtration, and washed with water. The second crop of potassium nitrate thus obtained amounted to about one half of the first crop (by weight).

The filtrate still remaining, and the washliquids from the several washing operations were then mixed together, and the mixture concentrated to about one half of its volume by evaporation. The precipitated salt (NaCl) was separated.

The remaining liquid (filtrate) was cooled to 32° F. and the resulting crystals of potassium nitrate were separated. This third crop of potassium nitrate amounted to about three-fourths of the first crop (by weight).

The remaining liquid was evaporated to about one-half of its volume and kept in that state, for the extraction of iodine or bromine compounds in any suitable manner.

The potassium nitrate product thus obtained was very pure, containing about 97% of $KNO_3$, the impurity remaining being chiefly salt (NaCl).

The other product of the process, NaCl, amounted to about 2½ times, by weight of the potassium nitrate product.

Second example

The sylvite or sylvinite in this case was treated with a much smaller amount of water than in the first example, the object being to leach out the potassium chloride and to leave the greater part of the salt (NaCl) behind. The caliche was dissolved in the same manner as in the first example, that is, using about three parts of water (by weight) to one part of caliche. The quantities used in this second example were 2.785 kilograms of sylvite and 1.762 kilograms of caliche, which were the figures required by the quantitative reaction (the KCl content of the sylvite and the $NaNO_3$ content of the caliche having been determined by analysis) for the production of one kilogram of pure $KNO_3$.

Purification of the two liquors with soda ash and ammonia was dispensed with, but each of them was first concentrated separately by evaporation to eliminate some of the NaCl, and thus purify the liquors to some extent. The sylvite solution yielded about 350 grams of salt, and the caliche solution about 280 grams.

After removal of this portion of the salt the two solutions were mixed and evaporated to about one third of the volume. Thus a further amount of NaCl (about 760 grams) was obtained, which was separated by filtration and washed twice in hot water.

The filtrate was further concentrated until it tested 46° Bé. hot, again separated from the salt by filtration and such salt (about 200 grams) washed with 200 cubic centimeters of hot water.

The salt washes were evaporated and the salt separated therefrom in its usual manner; this yielded about 35 grams of NaCl.

The nitrate was set on ice and potassium nitrate allowed to crystallize out while stirring the liquor. The crystals were separated by filtration and washed first with 100 cubic centimeters of a saturated potassium nitrate solution and then with 100 cubic centimeters of cold water. This yielded a first crop of potassium nitrate, amounting to about 750 grams.

The subsequent procedure was substantially the same as that employed in the first example after the production of the second crop of potassium nitrate, that is, I proceeded as follows:

The main solution (filtrate) was mixed with the wash liquors and the mixture evaporated to about one half of its volume, when it tested 45.5° Bé.

The solution was allowed to stand overnight to obtain a further crystallization of potassium nitrate. The next day the liquid was separated from the deposited crystals and the latter washed, first with 50 cubic centimeters of a saturated aqueous solution of $KNO_3$ and then with a little water. The second crop of potassium nitrate thus obtained was about 140 grams.

The filtrate was evaporated once more to about one-half of its volume, the salt separated, and the liquid allowed to cool.

In this second example, I obtained about 900 grams of crude potassium nitrate, and about twice as much NaCl. The yield of $KNO_3$ was less than in the first example, partly because leaching is not so efficient as a complete solution, and partly because only two crystallizing operations were performed instead of three.

Third example

To produce potassium nitrate from alunite, I calcine this latter material slightly by suitable heating, thereby rendering insoluble the excess of alumina and then I dissolve the alum. The solution is mixed with sodium nitrate (or ammonium nitrate, or calcium nitrate, or magnesium nitrate) and upon heating I obtain potassium nitrate by a double decomposition.

Fourth example

By mixing a solution of complex salts containing sodium carbonate (for instance natural soda) with a solution of complex salts (for instance sylvinite) containing potassium chloride, I obtain, as the result of a double decomposition, practically pure potassium carbonate and some sodium chloride, the presence of other salts in the mixture having no effect on this reaction. This process may be performed with the aid of apparatus of the same character as those used in the examples described above, for the preparation of potassium nitrate.

In the production of potassium nitrate, the following may be used instead of caliche: calcium nitrate, magnesium nitrate, ammonium nitrate, while as equivalents of sylvinite I may employ leucite, carnallite, kainite, salar, or the water of certain lakes. When caliche is used, the sodium chloride obtained as a residue may be subjected to the joint action of carbon dioxide gas and ordinary or synthetic ammonia, thereby producing sodium carbonate (soda) and ammonium chloride. The main product, potassium nitrate, is obtained of commercial purity (about 90%), and can be purified readily to render it available for use in the manufacture of explosives.

In practice I take a solution of natural sodium carbonate or of sodium carbonate obtained with the aid of ammonia and carbon dioxide gas, and mix such solution (without employing agents such as ammonia, carbon dioxide gas, or the electric current) with a solution of sylvite, kainite, carnallite, salar or other substances or products from a complex mineral containing KCl. Even the use of a single complex salt in this manner is to be considered as falling within the scope of my invention.

I may proceed similarly with ammonium carbonate whether alone or in complex solution in the filtered liquid at the time the process employing $CO_2$ and $NH_3$ is applied to the caliche, sylvite, or to waters or liquors (either natural or industrial) which contain sodium carbonate.

If the mineral contains potassium sulphate, barium carbonate or a calcium salt will have to be used in order to obtain potassium carbonate.

If instead of potassium chloride I had some potassium sulphate, I would obtain with a solution some complex salts containing sodium carbonate, also potassium carbonate with sodium sulphate.

A solution of complex salts containing some potassium sulphate in the presence of barium carbonate, will give some potassium carbonate and barium sulphate which it precipitated.

With the sodium sulphate and the KCl, I obtain a double decomposition which gives me, potassium sulphate and sodium chloride and this potassium sulphate may be treated as mentioned above.

Ammonium carbonate in the present of a complex salt solution containing potassium sulphate will give potassium carbonate and some ammonium sulphate by double decomposition.

When I attack caliche with $CO_2$ and $NH_3$, the liquid of the filters or liquid of the columns will contain some ammonium chloride, ammonium nitrate, ammonium carbonate, sodium chloride, and free ammonia.

If I add to this some sodium nitrate (simple salt), or a solution of caliche or any other solution containing some sodium nitrate and even the alkaline earth metals nitrates, after filtration and purification, I would obtain ammonium nitrate and sodium chloride with the ammonium chloride of the complex salts.

Ammonium carbonate will by double decomposition with the sodium nitrate give ammonium nitrate and sodium carbonate, the yield of ammonium nitrate being large.

Ammonium sulphate (simple salt) mixed with caliche (complex salt) or sodium nitrate, gives some sodium sulphate and some ammonium nitrate in spite of the presence of other salts contained in the solution.

In those divers cases I operate with warm, purified, clarified, concentrated solutions. The mother liquors are then treated according to appropriate known methods.

In preparing potassium nitrate from alunite (see third example) I could also use nitric acid or any other suitable acid to obtain a potassium salt able to produce a double decomposition.

I can also attack the alunite directly by fusion with soda and potash.

When using the ammonium sulphate (simple salt), I may according to process obtain the double decompositions with the complex salts of alkali or alkaline earth metals, magnesia, etc.

Thus, by this treatment of alunite I obtain either potassium nitrate, or potassium carbonate.

*To recapitulate*

If I utilize the sodium carbonate or natural soda and apply the double decomposition to a complex salt solution containing some KCl, potassium carbonate will be produced.

With potassium sulphate I use barium carbonate or a calcium salt or a magnesium salt, or some gay-lussite.

If the mineral contains KCl, potassium carbonate will be obtained.

If the mineral contains a sulphate, I will obtain along with the barium carbonate, some potassium carbonate.

Sodium or magnesium sulphate with a complex mineral such as sylvinite, kainite, leucite, salar, etc. etc. . . . will produce potassium sulphate.

Ammonium sulphate will produce ammonium chloride and potassium sulphate even when other salts are present.

Potassium sulphate with caliche which contains sodium nitrate will produce sodium sulphate and potassium nitrate.

The individual reactions occurring during the treatment described above are probably not novel in themselves, but hitherto the aim has always been to produce reactions between pure substances, for fear of detrimental secondary reactions. I have discovered, however, that when salts of alkali metals or of alkaline earth metals are in complex solution and when two of these salts have a great affinity for each other, a double decomposition will take place in spite of the presence of other salts, which remain neutral or inert as regards their effect on the main reaction. I am thus enabled to obtain superior results without the considerable expense incurred in the usual purifying treatments. While in the examples given above, two complex salts are present in the mixture or solution, I desire it to be understood that my invention is not restricted to the presence of two such salts, but will embrace cases in which the mixture or solution contains but one complex salt. In each case, the double decomposition referred to above will take place.

By the term "potassium chloride-bearing minerals", as employed in the claims, I mean to include all minerals containing appreciable or preponderating quantities of KCl, such as sylvine (sylvite), sylvinite, kainite, carnallite, etc.

What is claimed is:

1. The process which consists in treating potassium chloride-bearing minerals and caliche separately with water, mixing the two liquors thus obtained, partially evaporating the mixture and separating the precipitated solids from the liquid, and crystallizing potassium nitrate out of such liquid.

2. The process which consists in treating potassium chloride-bearing minerals and caliche separately with water, separately purifying the two liquors thus obtained of their non-alkali metal salts, thereupon mixing the two liquors, partially evaporating the mixture and separating the precipitated solids from the liquid, and crystallizing potassium nitrate out of such liquid.

In testimony whereof I have affixed my signature.

ARTHUR LAMBERT.